United States Patent

Iwai et al.

[15] 3,700,688
[45] Oct. 24, 1972

[54] ARYLSULFONYLPYRAZOLE COMPOUNDS

[72] Inventors: Issei Iwai; Yukichi Kishida; Tadahiro Iwashige, all of Tokyo, Japan

[73] Assignee: Sankyo Company Limited, Tokyo, Japan

[22] Filed: Oct. 1, 1970

[21] Appl. No.: 77,347

[30] Foreign Application Priority Data

Oct. 3, 1969 Japan ..................44/79073

[52] U.S. Cl. ..............260/310 R, 260/607 A, 96/109
[51] Int. Cl. ............................................C07d 49/18
[58] Field of Search..........................................260/310

[56] References Cited

OTHER PUBLICATIONS

Auwers et al., Berichte, vol. 66, p. 1205–1210 (1933)
Kirmse et al., Annalen der Chemie, vol. 614, p. 1–3 (1958)

Primary Examiner—Henry R. Jiles
Assistant Examiner—Harry I. Moatz
Attorney—Flynn & Frishauf

[57] ABSTRACT

Arylsulfonylpyrazole compounds having the formula

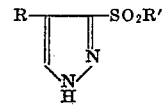

wherein R and R' are the same or different and each represents an aryl group which may be substituted with a straight or branched lower alkyl, lower alkoxy or halogen, are useful as an anti-fogging agent. The pyrazole compounds are prepared by reacting an arylsulfonylacetylene compound having the formula $$R\text{-}C \equiv C\text{-}SO_2\text{-}R'$$

wherein R and R' are the same as above with diazomethane in the presence of an inert organic solvent such as ether.

5 Claims, No Drawings

ARYLSULFONYLPYRAZOLE COMPOUNDS

This invention relates to novel arylsulfonylpyrazole compounds and a process for the preparation thereof.

In particular, it relates to the pyrazole compounds having the formula

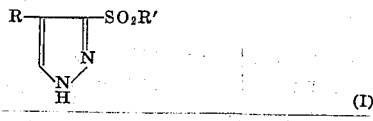

(I)

wherein R and R' are the same or different and each represents an aryl group which may be substituted with a lower alkyl, lower alkoxy or halogen, and a process for the preparation thereof.

Especially preferable compounds in this invention are phenylsulfonylpyrazole compounds having the formula

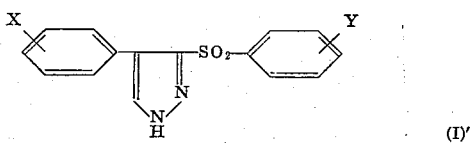

(I)' wherein X and Y are the same or different and each represents a hydrogen atom, a lower alkyl group, a lower alkoxy group or a halogen atom.

In the above formula (I) and (I)', the aryl group can be, for example, phenyl and naphthyl and the lower alkyl group can be a straight or branched alkyl group having from one to 5 carbon atoms, such as methyl, ethyl, n-propyl, isopropyl, n-butyl, isobutyl, tert-butyl, pentyl and the like. The lower alkoxy group can be, for example, methoxy, ethoxy, propoxy, isopropoxy, n-butoxy, isobutoxy, pentoxy and the like. The halogen atom can be fluorine, chlorine, bromine or iodine.

All of the pyrazole compounds (I) of this invention are novel and highly inhibit formation of fog at a hot weather development of silver halogenide photographic materials.

It is an object of this invention to provide a novel compound having anti-fogging activity and a process for the preparation thereof.

According to the present invention, the pyrazole compound having the formula (I) is prepared by reacting an arylsulfonylacetylene compound having the formula

(II)

wherein R AND R' are the same as above with diazomethane.

In carrying out the present process, the acetylene compound having the formula (II) is contacted with diazomethane in the presence of an inert organic solvent which would not adversely affect the reaction. Representative examples of these solvents include a hydrocarbon such as benzene and toluene, an ether such as ethyl ether, tetrahydrofuran and dioxane and a halogenated hydrocarbon such as methylene chloride and chloroform. Most preferably there may be employed ethyl ether. The reaction is preferably carried out by dissolving or suspending the acetylene compound (II) in the solvent and adding dropwise a solution containing diazomethane to the resulting solution or suspension. However, the reaction may be also carried out by introducing diazomethane gas into the acetylene compound solution or by adding the diazomethane solution to the acetylene compound as such.

It is desirable to employ diazomethane in an amount of from about 1.0 mole to about 1.2 moles per mole of the acetylene compound (II) in order to complete the reaction and to prevent side reactions. The reaction temperature is not critical. But the reaction is preferably carried out at first at a relatively lower temperature, especially about 0° – 10°C. to prevent decomposition of diazomethane and side reactions and then at room temperature to complete the reaction. The reaction period is varied mainly depending upon the reaction temperature and the kind of the starting material, but usually from about 5 hours to about 30 hours. After completion of the reaction, the desired product may be recovered from the reaction mixture by a conventional means. For example, the desired product is recovered by distilling off the solvent from the reaction mixture. The reaction product thus obtained may be, if necessary, further purified by a conventional means, for example, recrystallization or column chromatography.

In using the pyrazole compound (I) of this invention as an anti-fogging agent, it may be incorporated into at least one of the layers of a photographic element, including emulsion layers, sub-layers, internal layers, protective layers and backing layers in an amount of from 10 mg. to 2 g. per mole of a silver halogenide.

The invention may be further illustrated by the following examples which are not intended to limit the invention.

Example 1.

3-(p-Tolylsulfonyl)-4-phenylpyrazole

In 100 ml. of ethyl ether is dissolved 10.0 g. of p-tolylsulfonylphenylacetylene and the resulting solution is cooled to 5°C. To the solution is added dropwise 369 ml. of an ether solution containing 4.65 mg. of diazomethane per ml. of the ether solution. The mixture is stirred at 5°C. for 5 hours and then allowed to stand overnight at room temperature. The solvent is distilled off from the reaction mixture and the residue is recrystallized from ethyl acetate to give 7.05 g. of the desired product melting at 167.5° —168.5°C.

Analysis:
Calculated for
$C_{16}H_{14}O_2N_2S$:   C,64.42;   H,4.73;   N,9.39;   S,10.72
Found:   C,64.26;   H,4.82;   N,9.17;   S,10.69

Example 2.

3-(p-Tolylsulfonyl)-4-(p-tolyl)pyrazole

In 40 ml. of ethyl ether is dissolved 4.2 g. of p-tolylsulfonyl-p-tolylacetylene and the resulting solution is cooled to 5°C. To the solution is added dropwise 57 ml. of an ether solution containing 0.684 g. of diazomethane. The mixture is stirred at 5°C. for 6 hours and then allowed to stand overnight at room temperature. The solvent is distilled off from the reaction mixture and the residue is recrystallized from ethyl acetate to give 2.61 g. of the desired product melting at 156° — 158°C.

Analysis:
Calculated for

| $C_{17}H_{16}O_2N_2S$: | C,65.36; | H,5.16; | N,8.97; | S,10.27 |
| Found: | C,65.22; | H,5.19; | N,8.83; | S,10.34 |

Example 3.

3-(p-Tolylsulfonyl)-4-(p-bromophenyl)pyrazole

In 30 ml. of ethyl ether is dissolved 3.0 g. of p-tolylsulfonyl-p-bromophenylacetylene and the resulting solution is cooled to 5°C. To the solution is added dropwise 27 ml. of an ether solution containing 0.376 g. of diazomethane. The mixture is stirred at 5°C. for 5 hours and then allowed to stand overnight at room temperature.

The solvent is distilled off from the reaction mixture and the residue is recrystallized from ethyl acetate to give 1.35 g. of the desired product melting at 162° — 163°C.

Analysis:
Calculated for
| $C_{16}H_{13}N_2O_2SBr$: | C,50.93; H,3.47; N,7.43 S,8.50; Br,21.18 |
| Found: | C,50.88; H,3.64; N,7.31 S,8.57; Br,21.35 |

Example 4.

3-(p-Tolylsulfonyl)-4-(m-methoxyphenyl)pyrazole

In 23 ml. of ethyl ether is suspended 2.31 g. of p-tolylsulfonyl-m-methoxyphenylacetylene and the resulting suspension is cooled to 5° C.

To the suspension is added dropwise 26 ml. of an ether solution containing 0.339 g. of diazomethane. The mixture is stirred at 5°C. for 5 hours. The solvent is distilled off from the reaction mixture and the residue is dissolved in benzene and chromatographed on 100 g. of alumina (Woelm, grade I). The desired product is eluted with benzene-ether (1 : 1). The solvent is distilled off from the eluate and the residue is recrystallized from benzene to give 1.13 g. of the desired product melting at 107° — 109°C.

Analysis:
Calculated for
| $C_{17}H_{16}O_3N_2S$: | C,62.17; | H,4.91; | N,8.53; | S,9.77 |
| Found: | C,62.47; | H,4.91; | N,8.39; | S,9.81 |

What is claimed is:

1. A compound having the formula

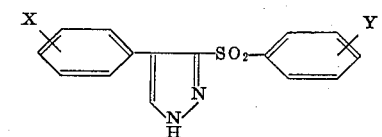

wherein X AND Y are the same or different and each represents a hydrogen atom, a lower alkyl group, a lower alkoxy group or a halogen atom.

2. 3-(p-Tolylsulfonyl)-4-phenylpyrazole.
3. 3-(p-Tolylsulfonyl)-4-(p-tolyl)pyrazole.
4. 3-(p-Tolylsulfonyl)-4-(p-bromophenyl)pyrazole.
5. 3-(p-Tolylsulfonyl)-4-(m-methoxyphenyl)pyrazole.

* * * * *